(12) United States Patent
Senatori

(10) Patent No.: US 9,134,766 B2
(45) Date of Patent: Sep. 15, 2015

(54) KEYBOARD HOLD DOWN MECHANISM

(75) Inventor: Mark David Senatori, The Woodlands, TX (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 979 days.

(21) Appl. No.: 13/259,614

(22) PCT Filed: Oct. 20, 2009

(86) PCT No.: PCT/US2009/061374
§ 371 (c)(1),
(2), (4) Date: Sep. 23, 2011

(87) PCT Pub. No.: WO2011/049559
PCT Pub. Date: Apr. 28, 2011

(65) Prior Publication Data
US 2012/0032821 A1   Feb. 9, 2012

(51) Int. Cl.
*H03K 17/94* (2006.01)
*H03M 11/00* (2006.01)
*G06F 1/16* (2006.01)
*H05K 5/00* (2006.01)
*H05K 7/00* (2006.01)
*G06F 3/02* (2006.01)
*H01H 13/86* (2006.01)

(52) U.S. Cl.
CPC ............ *G06F 1/1662* (2013.01); *G06F 3/0202* (2013.01); *H01H 13/86* (2013.01); *H01H 2223/014* (2013.01); *H01H 2223/028* (2013.01); *H01H 2231/042* (2013.01)

(58) Field of Classification Search
USPC ........... 361/679.08, 679.11, 679.17; 345/168; 341/22
See application file for complete search history.

(56) References Cited

U.S. PATENT DOCUMENTS

| | | | |
|---|---|---|---|
| 4,851,618 A | 7/1989 | Amino et al. | |
| 5,153,589 A | 10/1992 | Heys, Jr. et al. | |
| 5,510,953 A * | 4/1996 | Merkel | 361/679.08 |
| 5,966,284 A * | 10/1999 | Youn et al. | 361/679.17 |
| 6,211,475 B1 | 4/2001 | Ozaki | |
| 6,212,066 B1 | 4/2001 | Fetterman | |
| 6,262,883 B1 | 7/2001 | Kim | |
| 6,805,505 B2 | 10/2004 | Horiuchi et al. | |
| 7,495,893 B2 * | 2/2009 | Choi | 361/679.01 |
| 7,504,596 B2 | 3/2009 | Chou | |
| 2001/0029128 A1* | 10/2001 | Horiuchi et al. | 439/578 |

(Continued)

FOREIGN PATENT DOCUMENTS

| | | |
|---|---|---|
| EP | 1531485 | 6/2006 |
| JP | 7064670 | 3/1995 |

OTHER PUBLICATIONS

International Searching Authority, International Search Report and Written Opinion, Appln No. PCT/US2009/061374, date of mailing Jul. 8, 2010, 9 p.

(Continued)

*Primary Examiner* — Ariel Balaoing
*Assistant Examiner* — Mohamed Barakat
(74) *Attorney, Agent, or Firm* — Rathe Lindenbaum LLP

(57) ABSTRACT

A keyboard is within a cavity of a receptacle. A keyboard hold down mechanism is connected to the receptacle outward of a perimeter of the keyboard and is connected to the keyboard at a central portion of the keyboard inward of the perimeter.

19 Claims, 7 Drawing Sheets

(56) References Cited

U.S. PATENT DOCUMENTS

2002/0196164 A1\* 12/2002 Hasunuma ..................... 341/34
2003/0057076 A1    3/2003 Lee et al.
2004/0057195 A1    3/2004 Hsieh
2005/0035950 A1\*  2/2005 Daniels ........................ 345/169

2005/0083645 A1\*  4/2005 Moore et al. .................. 361/683

OTHER PUBLICATIONS

Keyboard Using Simplified Construction Techniquest, Dec. 1, 1990 UTC United States English, TBD n7 12-90 p. 148-150.

\* cited by examiner

KEYBOARD HOLD DOWN MECHANISM

BACKGROUND

Some keyboard assemblies include a keyboard positioned within a receptacle. Current structures used to secure the keyboard within the receptacle occupy valuable space, detrimentally increase a size of the keyboard assembly or utilize openings through a printed circuit board of the keyboard assembly.

DETAILED DESCRIPTION OF THE EXAMPLE EMBODIMENTS

Figure 1:
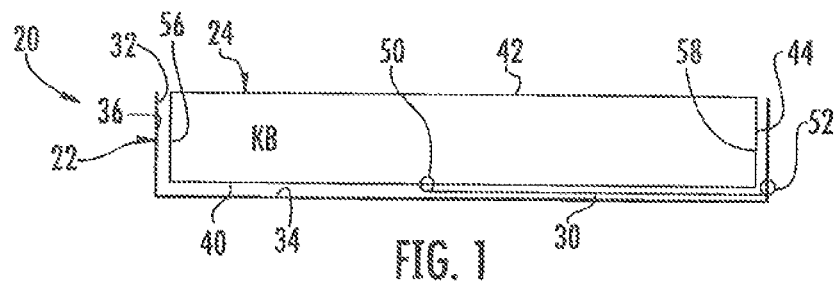
FIG. 1 is a sectional view schematically illustrating a keyboard assembly according to an example embodiment.

FIG. 1 schematically illustrates a keyboard assembly 20 according to an example embodiment. As will be described hereafter, keyboard assembly 20 secures a keyboard within a receptacle in a secure and reliable fashion so as to inhibit central portions of the keyboard from bending or flexing upward. Keyboard assembly 26 secures the keyboard within the receptacle in a compact manner and without openings extending through any printed circuit board that may underlie the keyboard.

Keyboard assembly 20 includes receptacle 22, keyboard 24 and keyboard hold down mechanism 30. Receptacle 22 comprises one or more structures which define or otherwise form an interior cavity 32 configured to receive keyboard 24. Cavity 32 includes a floor 34 and interior sides 36. Although receptacle 22 is schematically illustrated as being substantially rectangular, in other embodiments, receptacle 22 may have other shapes and configurations.

Keyboard 24 is schematically shown and comprises an assembled unit having a plurality of input locations configured to be actuated with use to generate distinct signals for facilitating the input of commands or information. Keyboard 24 has a bottom 40, a top 42 and sides or a perimeter 44. According to one embodiment, keyboard 24 is sufficiently flexible such that central portions of keyboard 24 may deform or warp upwardly, away from a bottom of receptacle 22, despite perimeter 44 of keyboard 24 being held down or secured to receptacle 22 along perimeter 44. For purposes of this disclosure, the terms "central portion" or "central portions", when referring to the central portion or portions of a keyboard, means areas or regions of a keyboard inward of the sides or perimeter of the keyboard that are spaced from the closest outermost side or perimeter of the keyboard by at least 2 inches (5.8 cm) in a direction perpendicular to the outermost side or perimeter of the keyboard.

In one embodiment, keyboard 24 includes a layout of a plurality of the keys such as letter keys, number/symbol keys, arrow keys and function keys (return, shift, control, escape, delete) and alike. Depression of individual keys result in an electrical circuit being closed to transmit an electrical signal. For example, in one embodiment, keyboard 24 may include a circuit board having electrically conductive ends, and a contact support that resiliently supports an electrical contact pad above the ends, wherein the depression of an associated key against the bias of the support lowers the contact into contact across the ends to electrically connect and transmit an electrical signal. In other embodiments, keyboard 24 may have other input mechanisms.

According to one embodiment, the contact support comprises a sheet of flexible resilient rubber or polymers supporting the contact pads while the circuit board is a flexible circuit. In one embodiment, keyboard 24 may additionally include a thin base forming the bottom of keyboard 24 and comprising a thin sheet of metal or other materials. As a result, keyboard 24 is sufficiently flexible such that central portions of keyboard 24 may deform or warp upwardly, away from a bottom of receptacle 22, such that the top 42 of keyboard 24 may have a convex shape despite perimeter 44 of keyboard 24 being held down or secured to receptacle 22 along perimeter 44.

Keyboard hold down mechanism 30 comprises one or more structures configured to hold and secure at least central portions of keyboard 24 within cavity 32 of receptacle 22. Keyboard hold down mechanism 30 secures or at least inhibits movement of bottom 40 of keyboard 24 upward (as seen in FIG. 1) in a direction away from floor 34 of cavity 32. Keyboard hold down mechanism 30 is coupled to keyboard 24 at a central location 50 which is at a central portion inward of perimeter 44. In some embodiments, keyboard hold down mechanism 30 may be additionally connected or secured to keyboard 24 at additional locations.

Keyboard hold down mechanism 30 extends from central location 50 in a direction non-perpendicular to the general plane in which bottom 40 extends and the general plane along which keyboard 24 extends. Keyboard hold down mechanism 30 projects beyond perimeter 44 and is connected to receptacle 22 at a location 52 outwardly beyond perimeter 44. Because keyboard hold down mechanism 30 extends between locations 1552 in a direction non-perpendicular to the floor 34 of receptacle 22 or keyboard 24, keyboard hold down mechanism 30 does not detrimentally increase a height of keyboard assembly 20. Moreover, keyboard assembly 20 may include a circuit hoard below keyboard 24 without keyboard hold down mechanism 30 extending through the circuit board.

According to one embodiment, keyboard hold down mechanism 30 is removably or releasably connected to keyboard 24 by a threaded connection or with a catch removably receiving a projection, hook, bayonet or latch. In one embodiment, keyboard 24 may include the catch while keyboard hold down mechanism 30 includes the projection, hook, bayonet or latch. In other embodiments, this relationship may be reversed. The catch may be engaged or disengaged from the projection, hook, bayonet or latch by moving one or both of the catch or the projection, hook, bad or latch with respect to one another and with respect to at least one of receptacle 22 and keyboard 24. Such movement may be a linear sliding movement, a pivotal moment or a rotational movement. Because keyboard 24 may be separated from hold down mechanism 30, hold down mechanism 30 facilitates insertion and removal of keyboard 24 with respect to receptacle 22. In other embodiments, mechanism 30 may be fixed or integrally formed as part of keyboard 24, wherein mechanism 30 is releasably or removably connected to receptacle 22 at location 52.

According to one embodiment, keyboard hold down mechanism 30 is releasably or removably connected to receptacle 22. For example, mechanism 30 may be connected to receptacle 22 by a threaded connection or with a catch removably receiving a projection, hook, bayonet or latch. The catch may be engaged or disengaged from the projection, hook, bayonet or latch by moving one or both of the catch or the projection, hook, bayonet or latch with respect to one another and with respect to at least one of receptacle 22 and keyboard 24. Such movement may be a linear sliding movement, a pivotal moment or a rotational movement. In embodiments where mechanism 30 is a separate mechanism releasably connected to both receptacle 22 and keyboard 24, keyboard 24 may be more easily inserted into cavity 32 without interference from mechanism 30.

According to one embodiment, keyboard hold down mechanism 30 has a rigidity greater than that of keyboard 24. As a result, mechanism 30 serves as a backbone to rigidify and stiffen those portions of keyboard 24 along which it extends. Consequently, central portions of keyboard 24 are less likely to bend or bulge upward away from floor 34 of cavity 32. According to one embodiment, perimeter 44 has a front edge 56 and a rear edge 58 spaced from front edge 56 by a distance D, wherein location 50 is spaced from each of the front edge 56 and the rear edge 58 by distance of at least ⅓D. As a result, a relatively large portion of keyboard 24 is stiffened and a substantially center or mid location of keyboard 24 is held down.

Figure 2:
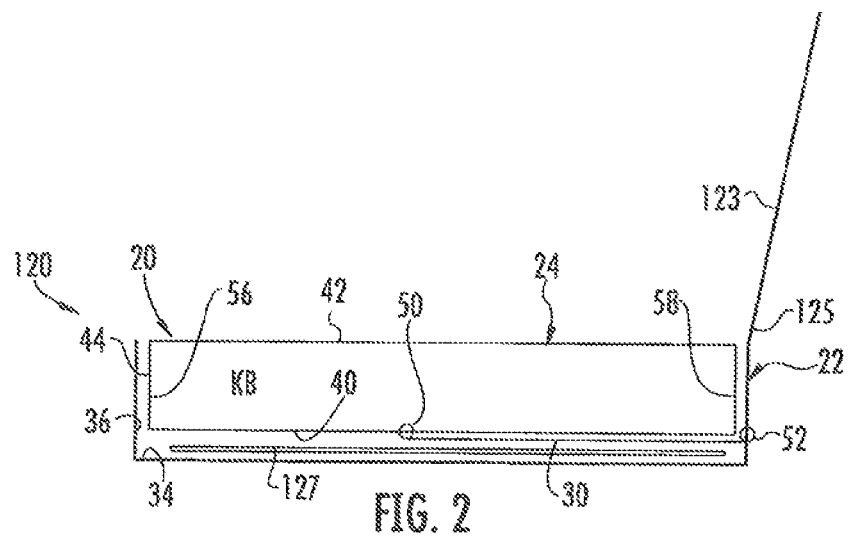
FIG. 2 is a sectional view schematically illustrating an electronic device having the keyboard assembly of FIG. 1 according to an example embodiment.

FIG. 2 schematically illustrates an electronic device (shown as a computing device 120) incorporating keyboard assembly 20. Computing device 120 comprises a notebook or laptop computer having a display screen 123 hinged or pivotally connected to receptacle 22 at hinge 125. In other embodiments, keyboard assembly 20 may extend along side a display screen.

As further shown by FIG. 2, computing device 120 additionally includes a printed circuit board 127. Printed circuit board 127 supports or electrically connects one more electrical components of computing device 120 such as a central processing unit, a hard disk drive, a random access memory card and the like. Printed circuit board 127 is contained within receptacle 22 opposite to keyboard 24 beneath keyboard 24. Printed circuit board 127 is sandwiched between keyboard 24 and floor 34 of receptacle 22. In other embodiments, printed circuit board 127 is opposite to keyboard 24, but is below receptacle 22. In such embodiments, an additional outer housing may be provided. Because circuit board 127 is located beneath keyboard 24, computing device 120 is more compact. Because keyboard hold down mechanism 30 extends from location 50 to location 52 in a direction non-perpendicular to the plane in which circuit board 127 extends as well as the plane in which keyboard 24 extends, keyboard hold down mechanism 30 does not extend through printed circuit board 127. In one embodiment, keyboard amounting mechanism 30 extends substantially parallel to the two planes containing the two major dimensions of printed circuit board 127 and keyboard 24.

Figure 3:
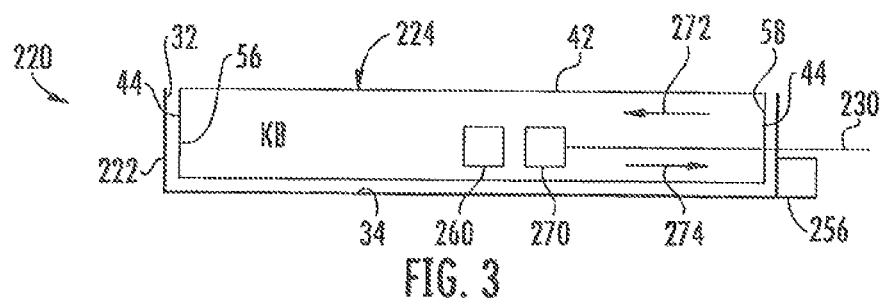
FIG. 3 is a sectional view schematically illustrating another embodiment of the keyboard assembly of FIG. 1 with a keyboard mounting mechanism in a disengaged position according to an example embodiment.
Figure 4:
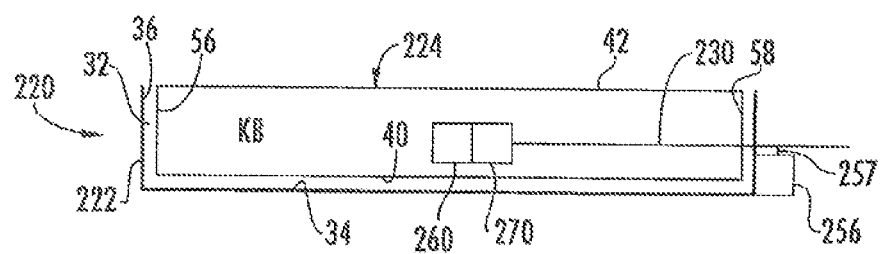
FIG. 4 is a sectional view schematically illustrating the keyboard assembly of FIG. 3 with the keyboard mounting mechanism in an engaged position according to an example embodiment.
Figure 5:
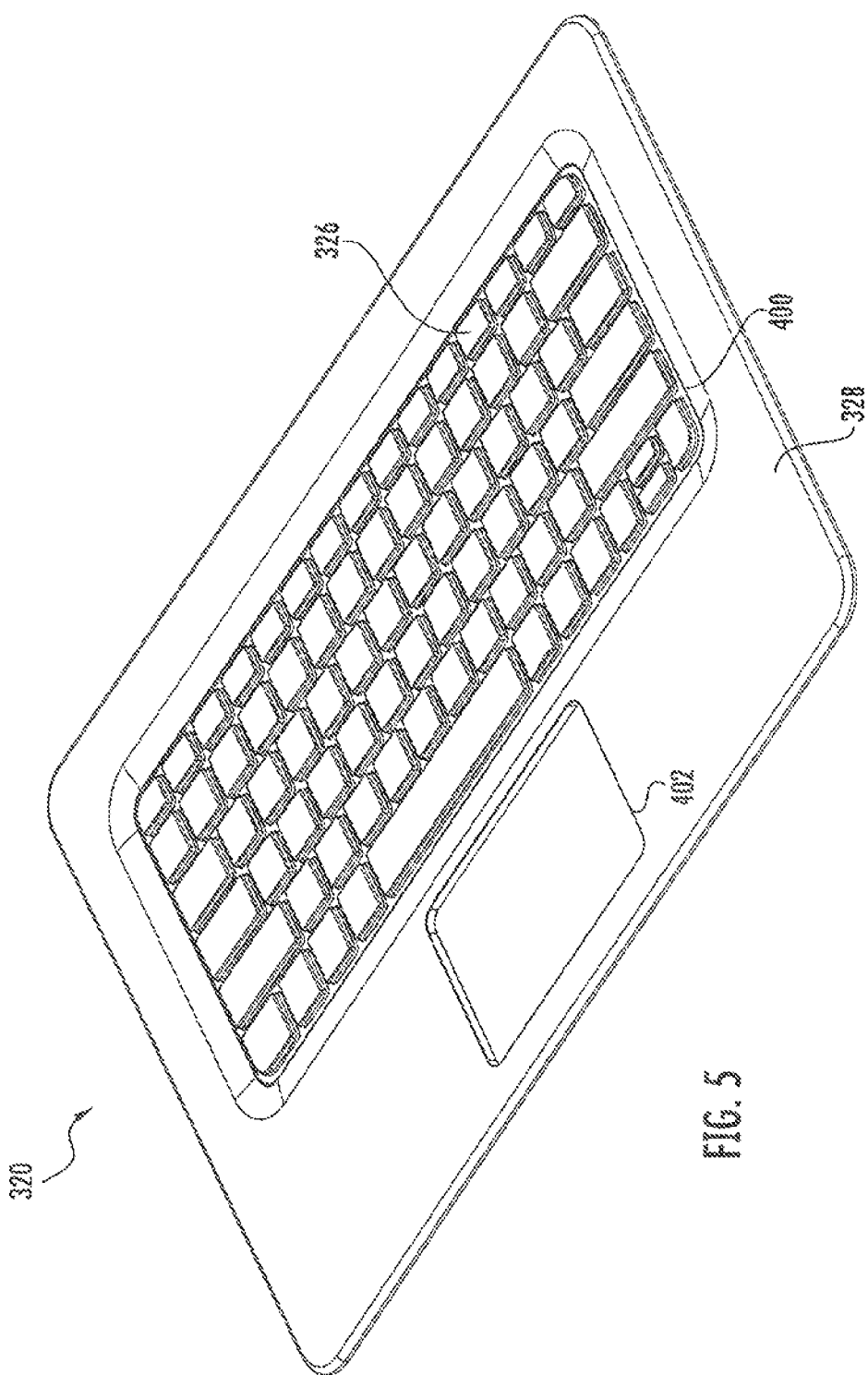
FIG. 5 as a top perspective view of another embodiment of the keyboard assembly of FIG. 1 according to an example embodiment.

FIGS. 3 and 4 schematically illustrate keyboard assembly 220, an example embodiment of keyboard assembly 20 described above with respect to FIGS. 1 and 2. Keyboard assembly 220 may be utilized in various devices having a keyboard such as computing device 120 shown and described above with respect to FIG. 2. Keyboard assembly 220 includes receptacle 222, keyboard 224 and keyboard hold down mechanism 230.

Receptacle 222 is similar to receptacle 22 in substantially all respects except that receptacle 222 includes mounting portion 256. Those remaining elements or components of receptacle 222 which correspond to elements or components of receptacle 22 are numbered similarly. Mounting portion 256 comprises one or more structures bonded, welded, fastened to, integrally formed as part of a single unitary body are otherwise fixed to receptacle 222 and configured to releasably retain hold down mechanism 230 against movement relative to receptacle 222 and keyboard 224. By retaining hold down mechanism 230 against movement relative to receptacle 222 and keyboard 224 when hold down mechanism 230 is connected to keyboard 224, mounting portion 256 may prevent inadvertent removal of keyboard 224 from receptacle 222.

In one embodiment, mounting portion 256 may comprise one or more bosses configured to receive one or more pins, threaded members or other structures 257 (schematically shown in FIG. 4) inserted through hold down mounting mechanism 230. In other embodiments, mounting portion 256 may alternatively comprise a projection such as a pin or threaded member that may be inserted through an opening in hold down mounting mechanism 230. In still other embodiments, mounting portion 256 may comprise other clamping, latching or locking mechanisms configured to releasably latch or join to hold down mechanism 230.

Keyboard 224 is similar to keyboard 24 except that keyboard 224 specifically includes hold down portion 260. Those remaining components or elements of keyboard 224 which correspond to components or elements of keyboard 24 are numbered similarly. Hold down portion 260 comprises a structure coupled to keyboard 224 at one more central portions of keyboard 224. Hold down portion 260 is carried by keyboard 224 and is configured to releasably connect, mate, hook or join to its corresponding hold down portion of hold down mechanism 230. Hold down portion 260 is specifically configured to releasably connect or join to the corresponding hold down portion of hold down mechanism 230 in response to movement of hold down mechanism 230 in a direction non-perpendicular to floor 34 of receptacle 222 or non-perpendicular to the plane containing the two major dimensions of keyboard 224. In the example illustrated, hold down portion 260 is specifically configured to releasably connect or join to the corresponding hold down portion of hold down mechanism 230 in response to movement of hold down mechanism 230 in a plane substantially parallel to floor 34 of receptacle 222 or parallel to the plane containing the two major dimensions of keyboard 224. In one embodiment, hold down portion 260 comprises a catch having an interior configure to releasably receive the corresponding hold down portion of hold down mechanism 230. In another embodiment, hold down portion 260 may comprise a bayonet, pin, rod, bar or hook or other projection configured to project into and to be received by a catch provided by the hold down portion of hold down mechanism 230 upon sufficient movement of hold down mechanism 230.

Keyboard hold down mechanism 230 comprises one or more members movably supporting a hold down portion 270 relative to receptacle 222 and keyboard 224. Keyboard hold down mechanism 230 movably supports hold down portion 270 for movement between a disengaged position shown in FIG. 3 and an engaged position shown in FIG. 4. In the disengaged position, portion 270 is disengaged or withdrawn from portion 260, facilitating removal or withdrawal keyboard 224 from receptacle 222. In the engaged position, portion 270 is engaged or connected to portion 260, inhibiting removal or withdrawal of keyboard 224 from receptacle 222.

Hold down portion 270 is specifically configured to releasably connect or join to hold down portion 260 of hold down mechanism 230 in response to movement of hold down mechanism 230 in a plane substantially parallel to floor 34 of receptacle 222 or parallel to the plane containing the two major dimensions of keyboard 224. In one embodiment, portion 270 linearly moves, slides or translates between the engaged and disengaged positions. In other embodiments, portion 270 may alternatively be configured to move in a rotating fashion or pivoting fashion between the engaged and disengaged positions. In other embodiments, portion 260 may also or alternatively be movable relative to receptacle 221 or keyboard 224 into and out of engagement with portion 270. Although portion 260, portion 270 and movement of mechanism 230 are schematically illustrated as extending above a bottom of keyboard 224, portion 260, portion 270 and movement of mechanism 230 may alternatively extend below bottom 40 of keyboard 224. In one embodiment, portion 260, portion 270 and movement of mechanism 230 may occur in a plane between bottom 40 and floor 34. In another embodiment, portion 260, portion 270 and movement of mechanism 230 may occur in a plane below receptacle 22.

In one embodiment, hold down portion 270 may comprise a bayonet, pin, rod, bar or hook or other projection configured to project into and to be received by a catch provided by hold down portion 260. In another embodiment, hold down portion 270 comprises a catch having an interior configured to releasably receive hold down portion 260. In the example illustrated, hold down mechanism 230 comprises a single structure, unit or member, wherein all portions of the member move in unison in the same direction and to the same extent. As a result, hold down mechanism 230 is compact and less complex. In other embodiments, hold down mechanism 230 may be formed from multiple members that sequentially transmit force to move portion 270.

FIGS. 5-10 illustrate keyboard assembly 320, a particular embodiment of keyboard assembly 20. Like keyboard assembly 20, keyboard assembly 320 may be utilized in various devices having a keyboard such as computing device 120 shown and described above with respect to FIG. 2. In one embodiment, keyboard device 320 is part of a computing device or electronic device in which display screen 123 is hinged to a housing at least partially about keyboard assembly 320 and printed circuit board 127 extends opposite to and below keyboard assembly 320.

Figure 6:
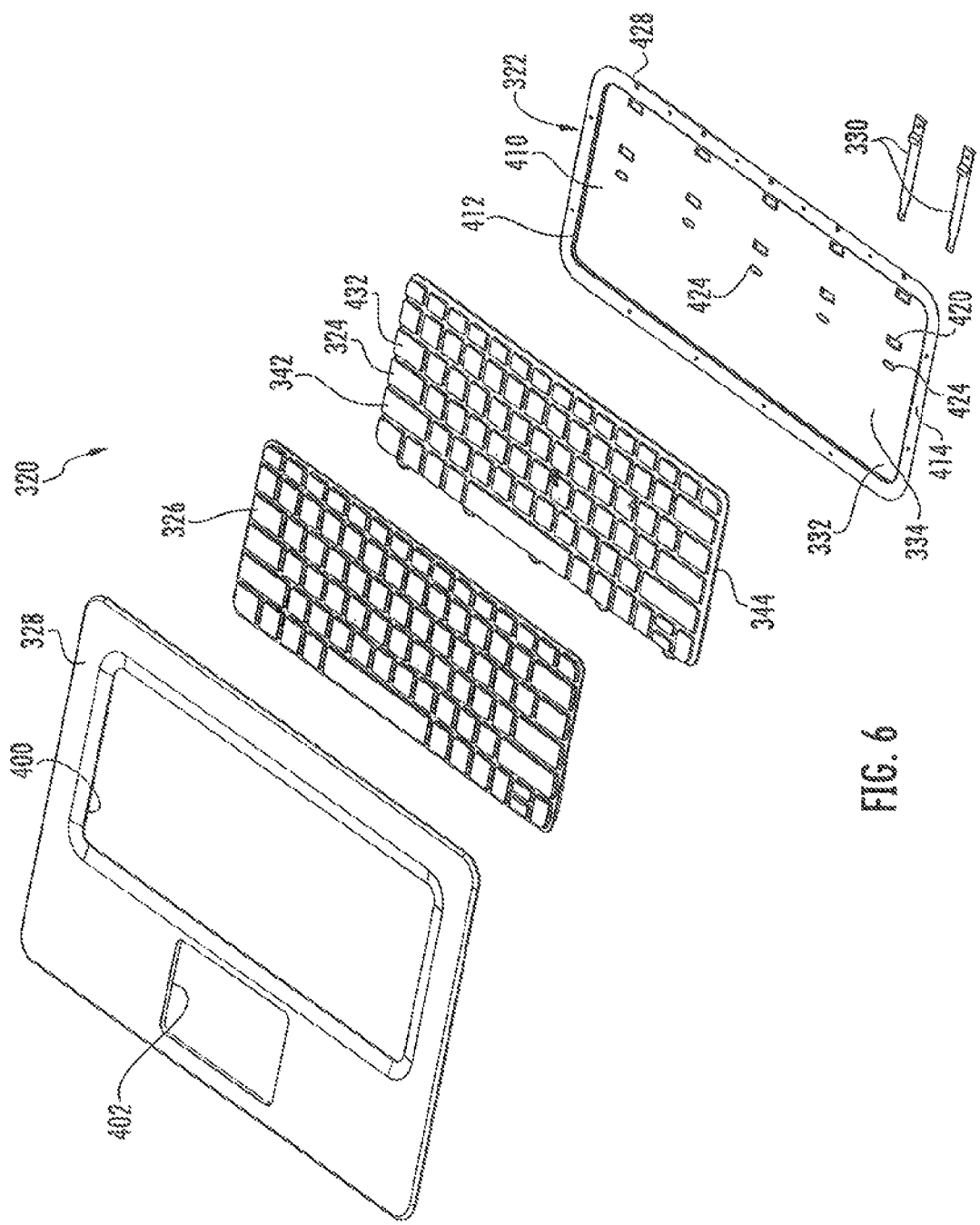
FIG. 6 is an exploded top perspective view of the keyboard assembly of FIG. 5 according to an example embodiment.
Figure 7:
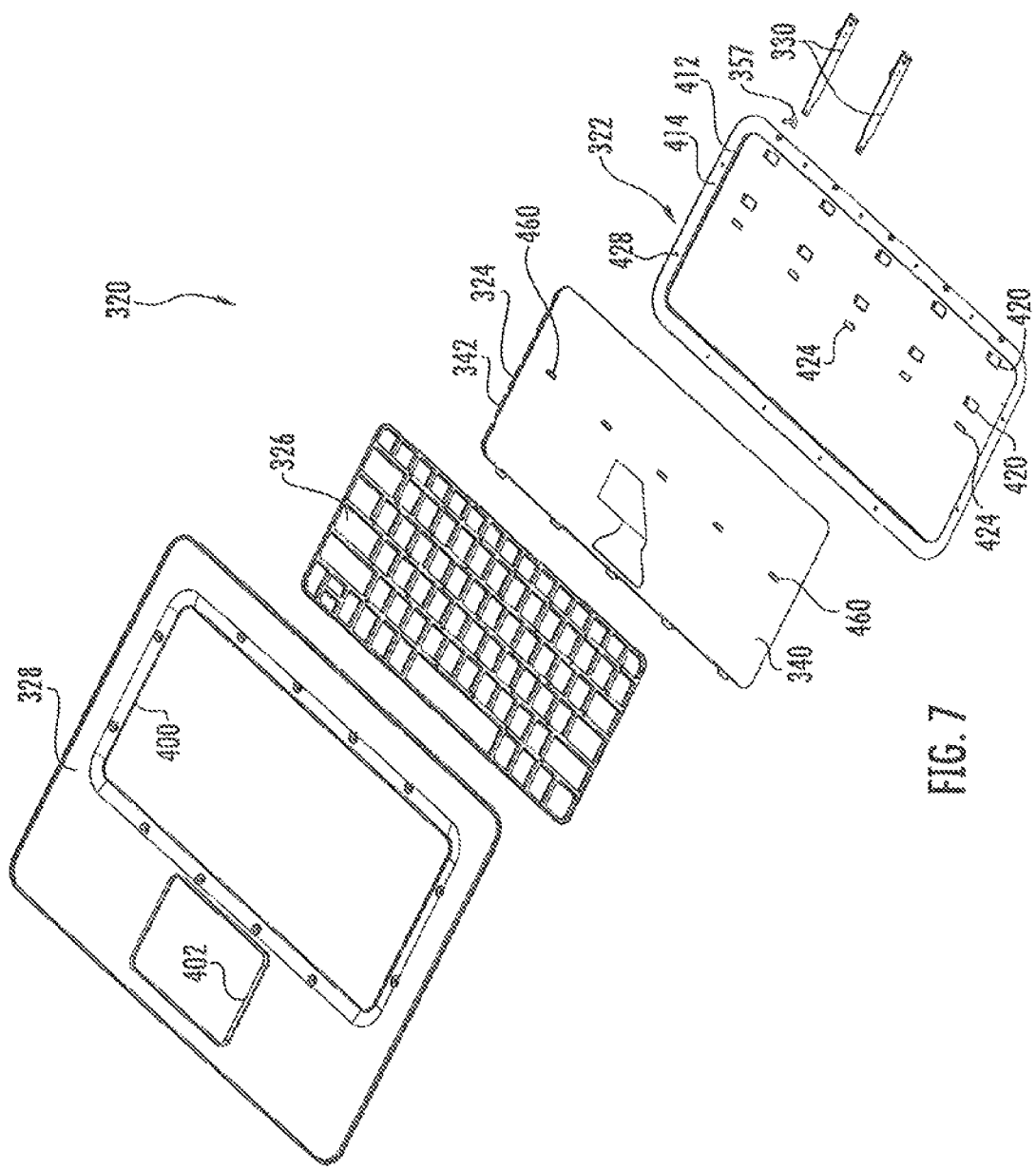
FIG. 7 is an exploded bottom perspective view of the keyboard assembly of FIG. 5 according to an example embodiment.

FIGS. 6 and 7 are exploded top and bottom perspective views illustrating keyboard assembly 320. As shown by FIGS. 6 and 7, similar to keyboard assembly 20, keyboard assembly 320 includes receptacle 322, keyboard 324, and keyboard hold down mechanisms 330. As further shown by FIGS. 6 and 7, keyboard assembly 320 additionally includes keyboard surround 326 and keyboard deck 328. Keyboard surround 326 comprises a flexible rubber-like elastomeric cover extending over a top 342 of keyboard 324 and keys of keyboard 324. Surround 326 protects keyboard 324.

Deck 328 comprises an additional cover or overlay having a central opening 400 through which top 342 of keyboard 324 and surround 326 are exposed. In the embodiment illustrated, deck 328 includes an additional opening 402 through which a touchpad may be provided. Deck 328 is configured to be secured to receptacle 322 to capture or sandwich keyboard 324 and surround 326 therebetween. In other embodiments, surround 326 or deck 328 may have other configurations or may be omitted.

Receptacle 322 comprises a basin configured to at least partially receive and contain keyboard 324. Receptacle 322 includes bottom 410, sidewalls 412, rim 414, catches 420 and mounting portions 356. Bottom 410 forms a floor 334 of receptacle 322. Bottom 410 includes apertures or openings 424 in alignment with corresponding catches 420. Openings 424 are sized, shaped and located to permit corresponding catches projecting from keyboard 3242 project through opening 424 as will be described hereafter.

Sidewalls 412 project upwardly from bottom 410 and cooperate with bottom 410 to form a cavity 332 sized and dimensioned or otherwise configured to receive keyboard 324. In the example illustrated, sidewalls 412 include openings or apertures 426 (shown in FIGS. 9 and 10) configured to permit portions of hold down mechanisms 330 to project through sidewalls 412 so as to engage, contact or abut an upwardly facing portion or surface of keyboard 324 for enhanced retention of keyboard 324. In other embodiments, apertures 426 may be omitted.

Rim 414 extends outwardly from sidewalls 426. Rim 424 provides a surface against which deck 328 may be secured. In the example illustrated, rim 414 includes openings 428 through which fasteners may be used to secure receptacle 322 to deck 328. In other embodiments, receptacle 322 may be joined to deck 328 in other fashions. Catches 420 comprise structures or guides extending downwardly from a lower surface of bottom 410 which are configured to slidably receive, align and guide hold down mechanisms 330. In the example illustrated, catches 420 comprised bridges which form a channel 130 (shown in FIG. 9) through which a hold down mechanism 330 may slide. In other embodiments, catches 420 may alternatively comprise one or more inverted L-shaped overhangs cantilevered over channel 430. In the example illustrated, each catch 430 is formed by moving, deforming and lowering a portion of bottom 410. In other embodiments, each catch 430 may be separately formed and joined, welded or bonded to a bottom surface of floor 330. In some embodiments, catches 420 may be integrally formed as part of the single unitary body with bottom 410.

Although receptacle 322 is illustrated as including five sets of aligned catches 420, in other embodiments, receptacle 32 may include fewer of such sets. Although each set is illustrated as including two aligned catches 420, in other embodiments, each set may include greater than two aligned catches or may include a single catch 420. Mounting portions 356 comprises structures coupled to receptacle 322 which are configured to facilitate releasable securement and retention of keyboard hold down mechanisms 330 against movement relative to receptacle 322 and keyboard 324. In the example illustrated in FIG. 9, mounting portions 356 comprise internally threaded bosses fixed to an underside of rim 414 and configured to threadably receive fasteners 357. In other embodiments, mounting portions 356 may be omitted or may have other configurations. In other embodiments, mounting portions 356 may be fixed to other structures which are fixed relative to receptacle 322 such as deck 328.

Keyboard 324 comprises an assembled unit having a plurality of input locations configured to be actuated so as to generate distinct signals for facilitating the input of commands or information. Keyboard 324 has a bottom 340 (shown in FIGS. 7 and 10), a top 342 (shown FIG. 6) and sides or a perimeter 344. According to one embodiment, keyboard 324 is sufficiently flexible such that central portions of keyboard 324 may deform or warp upwardly, away from floor 334 of receptacle 322, despite perimeter 344 of keyboard 324 being held down or secured to receptacle 322 along perimeter 344.

In the example illustrated, keyboard 324 includes a layout of a plurality of the keys 432 such as letter keys, number/symbol keys, arrow keys and function keys (return, shift, control, escape, delete) and the like. Depression of individual keys 432 result in an electrical circuit being closed to transmit an electrical signal. For example, in one embodiment, keyboard 324 may include a circuit board (not shown) having electrically conductive ends, and a contact support that resiliently supports an electrical contact pad above the ends, wherein the depression of an associated key against the bias of the support lowers the contact into contact across the ends to electrically connect and transmit an electrical signal. In other embodiments, keyboard 324 may have other input mechanisms.

According to one embodiment, the contact support (not shown) comprises a sheet of flexible resilient rubber or polymers supporting the contact pads while the circuit board is a flexible circuit. In one embodiment, keyboard 324 may additionally include a thin base 436 forming the bottom of keyboard 324 and comprising a thin sheet of metal or other materials. As a result, keyboard 324 is sufficiently flexible such that central portions of keyboard 324 may deform or warp upwardly, away from floor 334 of receptacle 322, such that the top 342 of keyboard 324 may have a convex shape despite perimeter 344 of keyboard 324 being held down or secured to receptacle 322 along perimeter 344.

Figure 10:
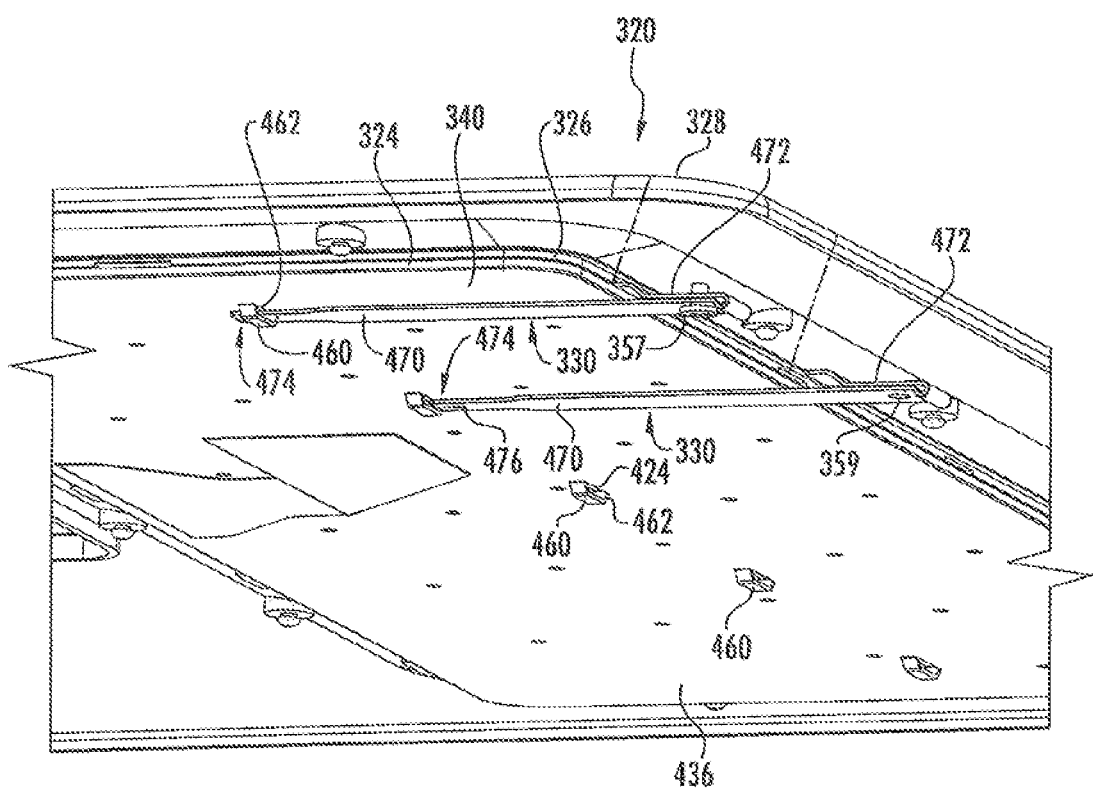
FIG. 10 is an enlarged bottom perspective view of the keyboard assembly of FIG. 5 according to an example embodiment with portions omitted for purposes of illustration.

As shown by FIGS. 7 and 10, keyboard 324 additionally includes catches 460. Catches 460 comprise structures extending downwardly from bottom 344 at central portions of keyboard 324. In one embodiment, perimeter 344 has a front edge 356 and a rear edge 358 spaced from front edge 356 by a distance D, wherein catches 460 are spaced from each of the front edge 356 and the rear edge 358 by distance of at least ⅓ D. As a result, a relatively large portion of keyboard 324 is stiffened and a substantially center or mid location of keyboard 324 is held down.

Catches 460 are configured to project through openings 424 and to also removably receive hold down mechanisms 330. In the example illustrated, catches 460 comprise bridges which form a channel 462 (shown in FIGS. 9 and 10) into which hold down mechanism 330 may slide. In other embodiments, catches 460 may alternatively comprise one or more inverted L-shaped overhangs cantilevered over channel 462. Although catches 460 are illustrated as forming channels 462 having two opposite open ends which are in substantial alignment with channels 430 of catches 420, in other embodiments, catches 460 may alternatively form cavities or recesses that receive hold down mechanisms 430, but which have a closed end or constricted opening opposite to channel 430 such that mechanisms 330 do not pass through catches 460, but abut the closed end or sides of the constricted opening at the back of the recess to indicate when mechanism 330 has been fully inserted into the recess of a catch 460. In the example illustrated, keyboard 324 includes five catches 460. In other embodiments, keyboard 324 may include fewer of such catches 460.

Keyboard hold down mechanisms 330 each comprise a single member configured to slidably pass through or at least partially into catches 420 of receptacle 322 and into engagement with catch 460 of keyboard 324. In the example illustrated, each hold down mechanism 330 is further configured to pass through one of openings 426. (shown in FIG. 9) while also contacting and upwardly facing surface of keyboard 324. In the example illustrated, each hold down mechanism 330 is further configured to be secured against movement relative to receptacle 322 and keyboard 324 using mounting portion 356.

Figure 9:
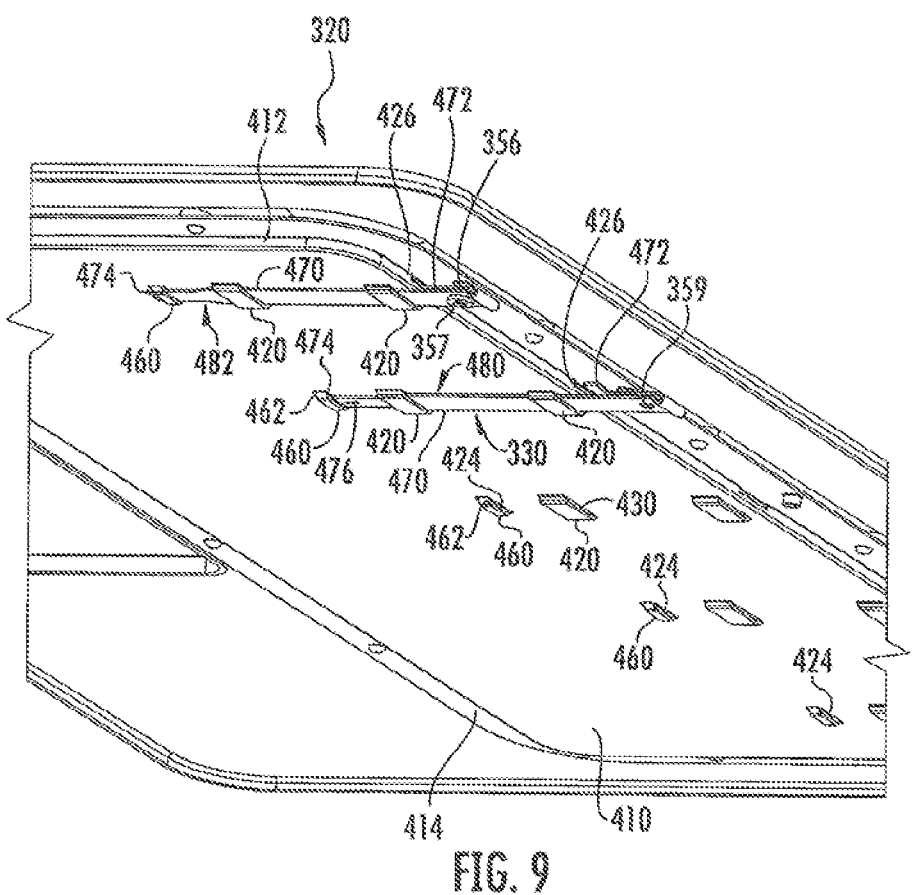
FIG. 9 is an enlarged bottom perspective view of the keyboard assembly of FIG. 5 according to an example embodiment.

As shown by FIG. 9, each hold down mechanism 330 includes lower bar 470 and upper prong 472. Lower bar 470 has a length sufficient so as to extend to a central portion of keyboard 324 while projecting beyond perimeter 344 of keyboard 324. In one embodiment, lower board 470 has a rigidity greater than that of keyboard 324 so as to stiffen keyboard 324. Lower bar 470 terminates at a tip 474 which passes through or is inserted into a channel or recess 462 of catch 460. Lower bar 470 includes a bump 476 proximate to tip 474. Bump 476 passes through channel 462 and includes a shoulder that contacts catch 460 so as to inhibit accidental disengagement of mechanism 330 from catch 460.

Upper prong 472 is coupled to lower bar 470 and is configured to extend through opening 426 into contact with an upwardly facing surface of keyboard 324. Upper prong 472 cooperates with lower bar 470 to securely retain keyboard 324 relative to receptacle 322. In the example illustrated, upper prong 472 is integral with lower bar 470, comprising a bent end portion of lower bar 470. In other embodiments, upper prong 472 may be fastener connected to lower bar 470. In yet other embodiments, upper prong 472 may be omitted.

Figure 8:
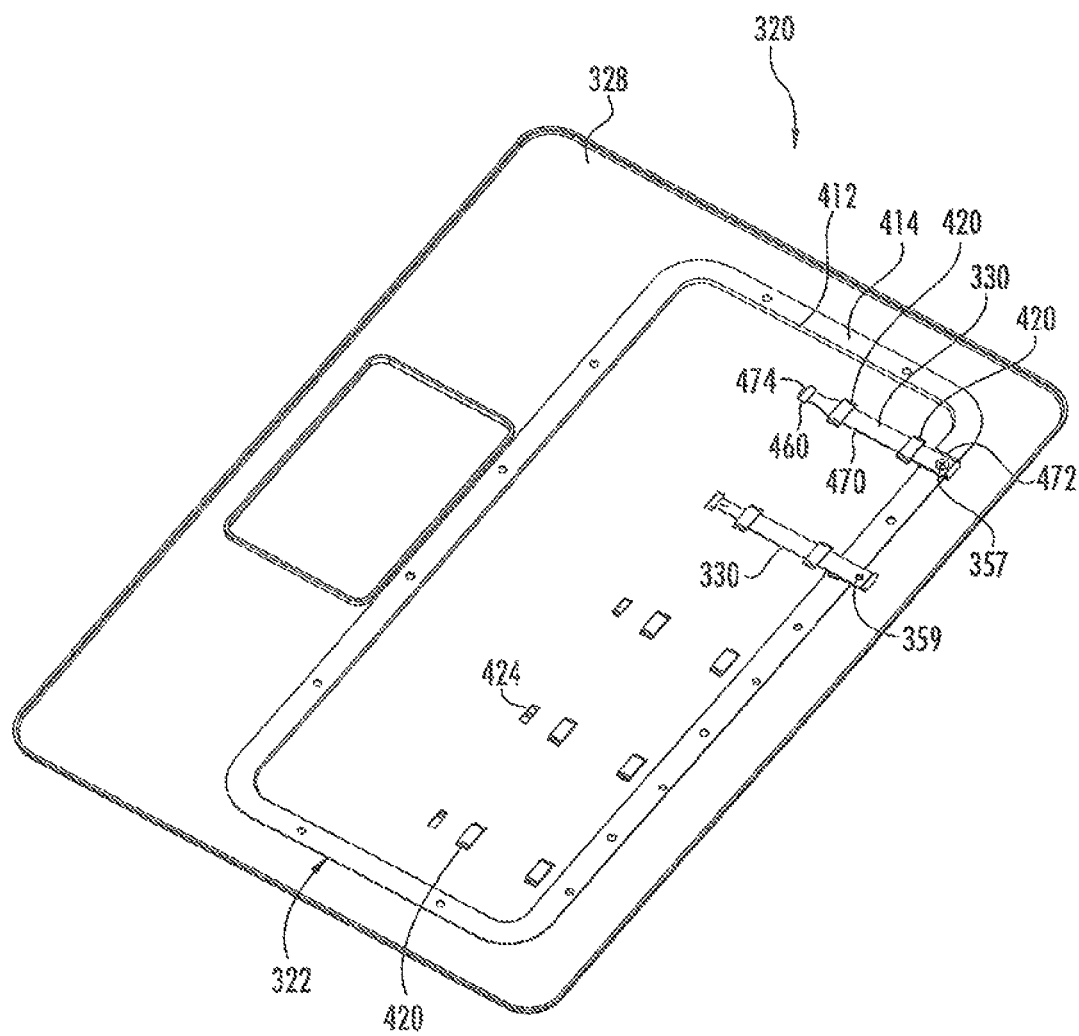
FIG. 8 is a bottom perspective view of the keyboard assembly of FIG. 5 according to an example embodiment.

FIGS. 8-10 illustrate securement of keyboard 324 in receptacle 322. FIGS. 8 and 9 illustrate two keyboard mounting mechanisms 330 at different stages of insertion. FIG. 10 is the same view as FIG. 9 with receptacle 322 omitted for purposes of illustration. To secure keyboard assembly 320, keyboard 320 is lowered into cavity 334 (shown in FIG. 6). As shown by FIG. 9, upon insertion of keyboard 324 into cavity 334, catches 460 project through openings 424 in bottom 410 of receptacle 322. Lower bar 470 is then slid through each of the aligned channels 430 of catches 420. Lower bar 430 is slid along and relative to receptacle 322 and keyboard 324 until tip 474 is moved into engagement with catch 460. In the example illustrated, such insertion is continued until bump 476 passes through channel 462. Bump 476 provides a tactile feel to a person inserting lower bar 470 to indicate when lower bar 470 is engaged with catch 460. At the same time that lower bar 470 is being moved, upper prong 472 is also moved through opening 426 into contact with an upwardly facing surface of keyboard 324. Upon mechanism 330 being moved to the engaged position with catch 460, opening 359 which passes through both lower bar 470 and upper prong 472 is aligned with mounting portion 356. Thereafter, fastener 357 is inserted through opening 356 and fastened to mounting portion 356 to retain mechanism 330 in the engaged position.

During such movement of mechanism 330 from the disengaged position 480 to the engaged position 482 (identified in FIG. 9), lower bar 470 moves in a plane non-perpendicular to (and parallel to) receptacle 322 and keyboard 324 (shown in FIG. 6). As a result, hold down mechanism 330 held a central portion of keyboard 324 towards the floor 410 of receptacle 322 without bosses, screws or fasteners extending perpendicular to keyboard 324. As a result, a printed circuit board (such as printed circuit board 127 shown in FIG. 2) may be provided below keyboard 324 and below receptacle 322 without openings through the printed circuit board for such bosses, screws or fasteners.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Unless specifically otherwise noted, the claims reciting a single particular element also encompass a plurality of such particular elements.

What is claimed is:

1. An apparatus comprising:
   a receptacle having a cavity;
   a keyboard within the cavity, the keyboard having a bottom, a top and a perimeter, wherein the perimeter has a first edge and a second edge opposite the first edge, the second edge being spaced from the first edge by a distance D; and
   a keyboard hold down mechanism connected to the receptacle outward of the perimeter and connected to the keyboard at a central portion of the keyboard inward of the perimeter, wherein the keyboard hold down mechanism extends from the first edge towards the second edge to the central portion, wherein the central portion spaced from the first edge and the second edge by at least ⅓ D.

2. The apparatus of claim 1, further comprising one of a catch and a projection on the bottom of the keyboard, wherein the keyboard hold down mechanism comprises the other of the catch and the projection and wherein the catch and the projection releasably engage one another.

3. The apparatus of claim 1, wherein the keyboard hold down mechanism is manually actuatable from an exterior of the receptacle while the keyboard is fully received within the receptacle to slide the keyboard hold down mechanism relative to the receptacle between a keyboard retaining position in which the keyboard is secured to the receptacle and a keyboard disengaged position in which the keyboard is removable from the receptacle.

4. The apparatus of claim 1, wherein the keyboard has a catch projecting from the bottom and extending through an opening in the receptacle and wherein the catch releasably receives the keyboard hold down mechanism which extends between the catch and the receptacle.

5. The apparatus of claim 1, further comprising a first catch projecting from the bottom of the keyboard through the receptacle, wherein the receptacle includes a second catch projecting from a bottom of the receptacle and wherein the keyboard hold down mechanism slidably extends through the first catch and into engagement with the second catch to releasably secure keyboard to the receptacle.

6. The apparatus of claim 1, wherein the keyboard hold down mechanism extends through an aperture in the receptacle into abutment with the bottom of the keyboard.

7. The apparatus of claim 1, wherein the keyboard has a first degree of rigidity and wherein the keyboard hold down mechanism has a second degree of rigidity greater than the first degree of rigidity.

8. The apparatus of claim 1, wherein the keyboard hold down mechanism is releasably connected to the keyboard.

9. The apparatus of claim 1, wherein the keyboard hold down mechanism is releasably connected to the receptacle.

10. The apparatus of claim 1, wherein the keyboard hold down mechanism is movable relative to the keyboard and through the receptacle in a direction non-perpendicular to the keyboard between a first position securing the keyboard to the receptacle and a second position releasing the keyboard from the receptacle.

11. The apparatus of claim 1, wherein the bottom extends substantially in a plane and wherein the keyboard hold down mechanism is movable through and relative to the receptacle parallel to the plane after the keyboard is fully received within the receptacle.

12. The apparatus of claim 1, further comprising a display screen hinged to the receptacle.

13. The apparatus of claim 1, further comprising a circuit board in the receptacle, opposite the keyboard and beneath the keyboard, wherein the keyboard hold down mechanism is sandwiched between the circuit board and the keyboard.

14. The apparatus of claim 1, wherein the keyboard hold down mechanism is a removable and separable with respect to both the keyboard and the receptacle.

15. A method comprising:
    disposing a keyboard having a bottom, a top and a perimeter into a cavity of a receptacle, the perimeter having a first edge and a second edge opposite the first edge with a central portion between the first edge and the second edge; and
    moving a keyboard mounting mechanism connected to the receptacle outward of the perimeter of the keyboard into engagement with a catch projecting downward from a bottom of the keyboard such that the keyboard mounting mechanism extends from the first edge towards the second edge to the central portion;
    wherein moving the keyboard mounting mechanism comprises actuating the keyboard mounting mechanism from an exterior of the receptacle while the keyboard is fully received within the receptacle to slide the keyboard mounting mechanism relative to the receptacle between a keyboard retaining catch engaged position in which the keyboard is secured to the receptacle and a keyboard disengaged position in which the keyboard is removable from the receptacle.

16. An apparatus comprising:
    a receptacle having a cavity;
    a keyboard within the cavity, the keyboard having a bottom, a top and a perimeter having a first edge and a second edge opposite the first edge with a central portion between the first edge and the second edge; and
    a keyboard hold down mechanism connected to the receptacle outward of the perimeter and connected to the keyboard at a central portion of the keyboard inward of the perimeter, wherein the keyboard hold down mechanism extends from the first edge towards the second edge to the central portion, wherein the keyboard has a catch projecting from the bottom and extending through an opening in the receptacle and wherein the catch releasably receives the keyboard hold down mechanism which extends between the catch and the receptacle.

17. The apparatus of claim 16, wherein the keyboard hold down mechanism is manually actuatable from an exterior of the receptacle while the keyboard is fully received within the receptacle to slide the keyboard hold down mechanism relative to the receptacle between a keyboard retaining position in which the keyboard is secured to the receptacle and a keyboard disengaged position in which the keyboard is removable from the receptacle.

18. The apparatus of claim 16, wherein the receptacle includes a second catch projecting from a bottom of the receptacle and wherein the keyboard hold down mechanism slidably extends through the first catch and into the second catch to releasably secure the keyboard to the receptacle.

19. The apparatus of claim 16, wherein the keyboard hold down mechanism is releasably secured to the receptacle to inhibit withdrawal of the keyboard hold down mechanism from the catch.

\* \* \* \* \*